United States Patent
Natarajan et al.

(10) Patent No.: US 12,221,553 B2
(45) Date of Patent: **\*Feb. 11, 2025**

(54) WATER-BASED BINDER SOLUTIONS FOR USE IN ADDITIVE MANUFACTURING PROCESSES

(71) Applicant: General Electric Company, Schenectady, NY (US)

(72) Inventors: Arunkumar Natarajan, Mason, OH (US); William C. Alberts, Saratoga Springs, NY (US)

(73) Assignee: General Electric Company, Evendale, OH (US)

( * ) Notice: Subject to any disclaimer, the term of this patent is extended or adjusted under 35 U.S.C. 154(b) by 94 days.

This patent is subject to a terminal disclaimer.

(21) Appl. No.: 17/876,028

(22) Filed: Jul. 28, 2022

(65) Prior Publication Data

US 2024/0034902 A1 Feb. 1, 2024

(51) Int. Cl.
*C09D 139/06* (2006.01)
*B29C 64/165* (2017.01)
(Continued)

(52) U.S. Cl.
CPC .......... *C09D 139/06* (2013.01); *B29C 64/165* (2017.08); *B33Y 10/00* (2014.12);
(Continued)

(58) Field of Classification Search
CPC .......... C09D 139/06; C09D 7/20; C09D 7/45; B29C 64/165; B33Y 10/00; B33Y 70/00; B29K 2039/06
See application file for complete search history.

(56) References Cited

U.S. PATENT DOCUMENTS

| 2,765,507 A | 10/1956 | Wolf et al. |
| 5,215,946 A | 6/1993 | Minh et al. |

(Continued)

FOREIGN PATENT DOCUMENTS

| CN | 102764939 A | 11/2012 |
| CN | 105562696 A | 5/2016 |

(Continued)

OTHER PUBLICATIONS

Extended European Search Report for Application No. 23185991.9 dated Nov. 28, 2023 (8 pages).

(Continued)

*Primary Examiner* — Michael M. Robinson
(74) *Attorney, Agent, or Firm* — Dinsmore & Shohl LLP

(57) ABSTRACT

A water-based binder solution comprises a thermoplastic binder, greater than or equal to 4 wt % to less than or equal to 20 wt % of a non-aqueous solvent having a boiling point greater than or equal to 100° C. and less than or equal to 175° C., and water. The thermoplastic binder comprises a first polymer strand having a weight average molecular weight (Mw) of from 5,000 g/mol to 15,000 g/mol; and at least one of a second polymer strand having a weight average molecular weight (Mw) of from 10,000 g/mol to 50,000 g/mol and a third polymer strand having a weight average molecular weight (Mw) of from 1,000 g/mol to 5,000 g/mol. A method of monitoring a print head of an additive manufacture process comprises depositing a water-based binder solution on the thermal paper.

20 Claims, 5 Drawing Sheets

(51) Int. Cl.
  *B33Y 10/00* (2015.01)
  *B33Y 70/00* (2020.01)
  *C09D 7/20* (2018.01)
  *C09D 7/45* (2018.01)

(52) U.S. Cl.
  CPC .............. *B33Y 70/00* (2014.12); *C09D 7/20* (2018.01); *C09D 7/45* (2018.01); *B29K 2039/06* (2013.01)

(56) References Cited

U.S. PATENT DOCUMENTS

| | | | |
|---|---|---|---|
| 5,749,041 | A | 5/1998 | Lakshminarayan et al. |
| 5,976,457 | A | 11/1999 | Amaya et al. |
| 6,075,083 | A | 6/2000 | Peiris et al. |
| 6,372,033 | B1 | 4/2002 | Chalasani et al. |
| 6,508,980 | B1 | 1/2003 | Sachs et al. |
| 6,949,284 | B2 | 9/2005 | Yoshihara et al. |
| 6,966,960 | B2 | 11/2005 | Boyd et al. |
| 7,795,349 | B2 | 9/2010 | Bredt et al. |
| 8,530,578 | B2 | 9/2013 | Bharti et al. |
| 8,992,720 | B2 | 3/2015 | Bharti et al. |
| 10,486,363 | B2 | 11/2019 | Sachs et al. |
| 10,688,558 | B2 | 6/2020 | Barua et al. |
| 10,828,827 | B2 | 11/2020 | Kushara et al. |
| 2005/0170285 | A1 | 8/2005 | Sugasaki et al. |
| 2011/0277952 | A1* | 11/2011 | Di ............................ C08L 71/02 164/526 |
| 2015/0069649 | A1 | 3/2015 | Bai et al. |
| 2015/0291833 | A1 | 10/2015 | Kunc et al. |
| 2016/0001506 | A1 | 1/2016 | Hirata et al. |
| 2017/0015124 | A1 | 1/2017 | Donaldson |
| 2018/0071820 | A1 | 3/2018 | Natarajan et al. |
| 2018/0236731 | A1 | 8/2018 | Natarajan et al. |
| 2018/0326484 | A1 | 11/2018 | Gonzalez et al. |
| 2019/0054527 | A1 | 2/2019 | Natarajan et al. |
| 2019/0375009 | A1 | 12/2019 | Gibson |
| 2020/0001359 | A1* | 1/2020 | Nilsson ............... C04B 35/6346 |
| 2021/0370589 | A1* | 12/2021 | Natarajan .............. B33Y 80/00 |
| 2021/0371641 | A1 | 12/2021 | Natarajan et al. |

FOREIGN PATENT DOCUMENTS

| | | |
|---|---|---|
| EP | 3915786 A1 | 12/2021 |
| JP | 2015196381 A | 11/2015 |
| JP | 5965790 B2 | 8/2016 |
| JP | 2022000533 A | 1/2022 |
| WO | 2014028679 A1 | 2/2014 |
| WO | 2016108154 A1 | 7/2016 |
| WO | 2017018984 A1 | 2/2017 |
| WO | 2017029657 A1 | 2/2017 |
| WO | 2017046132 A1 | 3/2017 |
| WO | 2017127221 A1 | 7/2017 |
| WO | 2020237161 A1 | 11/2020 |

OTHER PUBLICATIONS

Bikas H et al: "Additive manufacturing methods and modelling approaches: a critical review", The International Journal of Advanced Manufacturing Technology, Springer, London, vol. 83, No. 1, Jul. 24, 2015 (Jul. 24, 2015), pp. 389-405, XP035745483, ISSN: 0268-3768, DOI: 10.1007/S00170-015-7576-2 * paragraph [2.4.1] *.
Von Fraunhofer, J. Anthony, "Adhesion and Cohesion", International Journal of Dentistry, Feb. 21, 2012, 16 pages.
International Search Report and Written Opinion issued in PCT Application No. PCT/US2018/040983 dated Nov. 15, 2018.
Boere et al., Biofabrication of Reinforced 3D Scaffolds Using Two Component Hydrogels; Journal of Material Chemistry; Oct. 9, 2015; Issue: 46.
Saxena, S.K., "Polyvinyl Alcohol (PVA) Chemical and Technical Assessment (CTA)", 2004, JECFA, pp. 1-3.
Japanese Patent Office Action for Application No. 2023-123544 dated Dec. 10, 2024 (4 pages with English Translation).

* cited by examiner

WATER-BASED BINDER SOLUTIONS FOR USE IN ADDITIVE MANUFACTURING PROCESSES

TECHNICAL FIELD

This disclosure relates to additive manufacturing and, more particularly, to binders for use in additive manufacturing processes.

BACKGROUND

Additive manufacturing, also known as 3D printing, is a process in which material is built up layer by layer to form a three-dimensional part. Binder jetting is an additive manufacturing technique based on the use of a binder to join particles of a powder to form a three-dimensional part. In particular, the binder is jetted from a print head onto successive layers of the powder in a build volume, where layers of the powder and the binder adhere to one another to form a green body part. In some applications, the green body part is suitable for end-use. In other applications, subsequent processing, such as removal of the binder and sintering of the powder, may be needed to transform the green body part into a finished, three-dimensional part.

Conventional binder solutions may require a relatively long time to wick into the layer of powder, which may increase the amount of time required before a subsequent layer of powder can be deposited within the build volume. A longer wick time decreases the throughput, and therefore the productivity, of the additive manufacturing apparatus. However, some binder solutions that have achieved improved wicking time may not produce a pattern on thermal paper during a print head check.

Accordingly, the need exists for alternative binder solutions that enable decreased wick time and print head checks utilizing thermal paper.

SUMMARY

Various aspects disclosed herein meet these needs by providing an aqueous binder solution comprising a thermoplastic binder, greater than or equal to 4 wt % to less than or equal to 20 wt % of a non-aqueous solvent having a boiling point greater than or equal to 100° C. and less than or equal to 175° C., and water. The thermoplastic binder comprises a first polymer strand and at least one of a second polymer strand and a third polymer strand. In various aspects, the first polymer strand has a weight average molecular weight (Mw) greater than or equal to 5,000 g/mol and less than or equal to 15,000 g/mol, the second polymer strand has a weight average molecular weight greater than or equal to 10,000 g/mol and less than or equal to 50,000 g/mol, and the third polymer strand has a weight average molecular weight greater than or equal to 1,000 g/mol and less than or equal to 5,000 g/mol. The first polymer strand differs from each of the second polymer strand and the third polymer strand and the second polymer strand differs from the third polymer strand. The formulation rapidly wicks into the powder layer, while also balancing a shortened cure time as compared to conventional binder solutions with the ability to pattern thermal paper during a print head check. Additional features and advantages will be described in greater detail below.

According to a first aspect A1, a water-based binder solution for use in additive manufacturing may comprise: a first polymer strand having a weight average molecular weight (Mw) greater than or equal to 5,000 g/mol and less than or equal to 15,000 g/mol; and at least one of a second polymer strand having a weight average molecular weight (Mw) greater than or equal to 10,000 g/mol and less than or equal to 50,000 g/mol and a third polymer strand having a weight average molecular weight (Mw) greater than or equal to 1,000 g/mol and less than or equal to 5,000 g/mol; wherein the first polymer strand differs from each of the second polymer strand and the third polymer strand and the second polymer strand differs from the third polymer strand; greater than or equal to 4 weight percent (wt %) to less than or equal to 20 wt % of a non-aqueous solvent, based on a total weight of the water-based binder solution, the non-aqueous solvent having a boiling point greater than or equal to 100° C. and less than or equal to 175° C.; and water.

A second aspect A2 includes the water-based binder solution according to the first aspect A1, wherein the non-aqueous solvent is present in the water-based binder solution in an amount greater than or equal to 6 wt % and less than 18 wt %, based on the total weight of the water-based binder solution.

A third aspect A3 includes the water-based binder solution according to the first aspect A1, wherein the non-aqueous solvent comprises at least one of 2-methoxy ethanol, butanol, 2-butanol, tert-butanol, 1-methoxy-2-propanol, 2-butoxy ethanol, isoamyl alcohol, isobutyl alcohol, 2-butoxyethanol, and di(propylene glycol)dimethyl ether.

A fourth aspect A4 includes the water-based binder solution according to the first aspect A1, wherein the first polymer strand comprises at least one of polyvinyl pyrrolidone (PVP) and polyvinyl alcohol (PVA).

A fifth aspect A5 includes the water-based binder solution according to the fourth aspect A4, wherein the first polymer strand is present in an amount greater than or equal to 5 wt % and less than or equal to 20 wt %, based on the total weight of the water-based binder solution.

A sixth aspect A6 includes the water-based binder solution according to the first aspect A1, wherein the thermoplastic binder comprises the second polymer strand in an amount greater than or equal to 0.5 wt % and less than or equal to 7 wt %, based on the total weight of the water-based binder solution.

A seventh aspect A7 includes the water-based binder solution according to the sixth aspect A6, wherein the thermoplastic binder comprises the third polymer strand in an amount greater than or equal to 0.1 wt % and less than or equal to 5 wt %, based on the total weight of the water-based binder solution.

An eighth aspect A8 includes the water-based binder solution according to the first aspect A1, wherein the second polymer strand comprises at least one of polyvinyl alcohol (PVA), polyacryl amide (PAAm), polyvinyl methyl ether maleic anhydride (PVME-MA), and derivatives thereof.

A ninth aspect A9 includes the water-based binder solution according to the first aspect A1, wherein the third polymer strand comprises at least one of polyacrylic acid (PAA), polymethyl methacrylate (PMMA), polyacrylamide (PAAm), and derivatives thereof.

A tenth aspect A10 includes the water-based binder solution according to the first aspect A1, wherein the water-based binder solution further comprises greater than or equal to 0.1 wt % and less than or equal to 2 wt % of a surfactant, based on a total weight of the water-based binder solution.

An eleventh aspect A11 includes the water-based binder solution according to the first aspect A1, wherein a total weight of polymers present in the water-based binder solution is greater than or equal to 5 wt % and less than or equal to 20 wt %, based on a total weight of the water-based binder solution.

According to a twelfth aspect A12, a method of monitoring a print head of an additive manufacturing process may comprise: positioning a thermal paper on a working surface; and depositing a water-based binder solution on the thermal paper, the water-based binder solution comprising: greater than or equal to 4 wt % to less than or equal to 20 wt % of a non-aqueous solvent, based on a total weight of the water-based binder solution, the non-aqueous solvent having a boiling point greater than or equal to 100° C. and less than or equal to 175° C.; and a thermoplastic binder, the thermoplastic binder comprising: a first polymer strand having a weight average molecular weight (Mw) greater than or equal to 5,000 g/mol and less than or equal to 15,000 g/mol; and at least one of a second polymer strand having a weight average molecular weight (Mw) greater than or equal to 10,000 g/mol and less than or equal to 50,000 g/mol and a third polymer strand having a weight average molecular weight (Mw) greater than or equal to 1,000 g/mol and less than or equal to 5,000 g/mol, wherein the first polymer strand differs from each of the second polymer strand and the third polymer strand; and wherein the second polymer strand differs from the third polymer strand.

A thirteenth aspect A13 includes the method according to the twelfth aspect A12, wherein the non-aqueous solvent is present in the water-based binder solution in an amount greater than or equal to 6 wt % and less than 18 wt %, based on the total weight of the water-based binder solution.

A fourteenth aspect A14 includes the method according to the twelfth aspect A12, wherein the non-aqueous solvent comprises at least one of 2-methoxy ethanol, butanol, 2-butanol, tert-butanol, 1-methoxy-2-propanol, 2-butoxy ethanol, isoamyl alcohol, isobutyl alcohol, 2-butoxyethanol, and di(propylene glycol)dimethyl ether.

A fifteenth aspect A15 includes the method according to the twelfth aspect A12, wherein the first polymer strand comprises at least one of polyvinyl pyrrolidone (PVP) and polyvinyl alcohol (PVA).

A sixteenth aspect A16 includes the method according to the fifteenth aspect A15, wherein the first polymer strand is present in an amount greater than or equal to 5 wt % and less than or equal to 20 wt %, based on the total weight of the water-based binder solution.

A seventeenth aspect A17 includes the method according to the twelfth aspect A12, wherein the thermoplastic binder comprises the second polymer strand in an amount greater than or equal to 0.5 wt % and less than or equal to 7 wt %, based on the total weight of the water-based binder solution.

An eighteenth aspect A18 includes the method according to the seventeenth aspect A17, wherein the thermoplastic binder comprises the third polymer strand in an amount greater than or equal to 0.1 wt % and less than or equal to 5 wt %, based on the total weight of the water-based binder solution.

A nineteenth aspect A19 includes the method according to the twelfth aspect A12, wherein a total weight of polymers present in the water-based binder solution is greater than or equal to 5 wt % and less than or equal to 20 wt %, based on the total weight of the water-based binder solution.

According to a twentieth aspect A20, a method of additive manufacturing may comprise: depositing a layer of a powder on a working surface; selectively depositing a water-based binder solution comprising a thermoplastic binder and greater than or equal to 4 wt % to less than or equal to 20 wt % of a non-aqueous solvent, based on a total weight of the water-based binder solution, having a boiling point greater than or equal to 100° C. and less than or equal to 175° C. into the layer of powder in a pattern representative of a structure of a part, wherein: the thermoplastic binder comprises: a first polymer strand having a weight average molecular weight (Mw) greater than or equal to 5,000 g/mol to less than or equal to 15,000 g/mol; and at least one of a second polymer strand having a weight average molecular weight (Mw) greater than or equal to 10,000 g/mol to less than or equal to 50,000 g/mol and a third polymer strand having a weight average molecular weight (Mw) greater than or equal to 1,000 g/mol to less than or equal to 5,000 g/mol; the first polymer strand differs from each of the second polymer strand and the third polymer strand; the second polymer strand differs from the third polymer strand; and coupling the first polymer strand with the at least one of the second polymer strand and the third polymer strand to form a green body part.

Additional features and advantages of the aspects disclosed herein will be set forth in the detailed description, which follows, and in part will be readily apparent to those skilled in the art from that description or recognized by practicing the disclosed aspects as described herein, including the detailed description which follows, the claims, as well as the appended drawings.

It is to be understood that both the foregoing general description and the following detailed description present aspects intended to provide an overview or framework for understanding the nature and character of the claimed aspects. The accompanying drawings are included to provide further understanding, and are incorporated into and constitute a part of this specification. The drawings illustrate various aspects of the disclosure, and together with the description serve to explain the principles and operations thereof.

DETAILED DESCRIPTION

Figure 1:
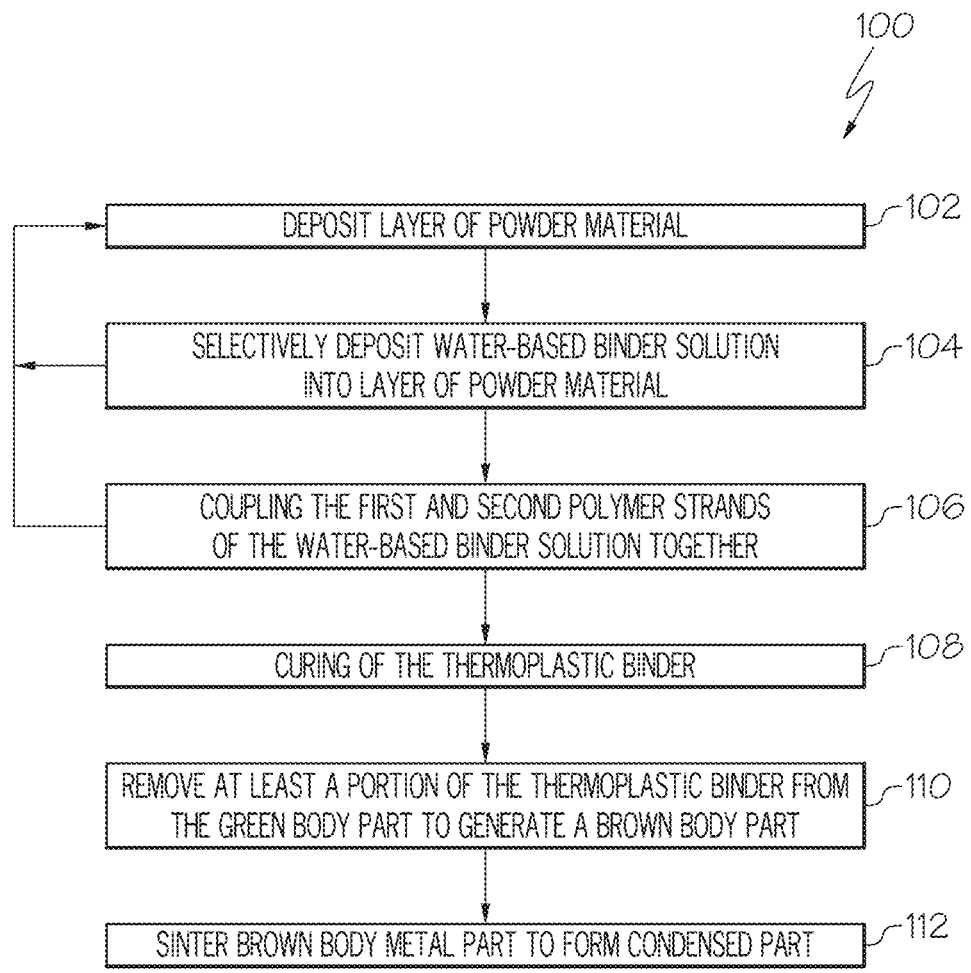
FIG. 1 is a flow diagram of an example method of manufacturing a part via additive manufacturing using a water-based binder solution according to one or more aspects shown and described herein.

Reference will now be made in detail to various aspects of a water-based binder solution for use in additive manufacturing processes. In particular, various aspects of water-based binder solutions comprise a thermoplastic binder, greater than or equal to 4 wt % to less than or equal to 20 wt % of a non-aqueous solvent having a boiling point greater than or equal to 100° C. and less than or equal to 175° C., and water. Various aspects of water-based binder solutions will be referred to herein with specific reference to the appended drawings.

Ranges can be expressed herein as from "about" one particular value, or to "about" another particular value. When such a range is expressed, another aspect includes from the one particular value or to the other particular value. Similarly, when values are expressed as approximations, for example by use of the antecedent "about," it will be understood that the particular value forms another aspect. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply ab solute orientation.

As used herein, the singular forms "a," "an" and "the" include plural referents unless the context clearly dictates otherwise. Thus, for example, reference to "a" component includes aspects having two or more such components, unless the context clearly indicates otherwise.

The terms "weight percent" or "wt %," as described herein, refer to the weight fraction of the component of the water-based binder solution based on the total amount (i.e., weight) of the water-based binder solution, unless otherwise noted.

The term "boiling point," as described herein, refers to the boiling point of the component at 1 atm, unless otherwise noted.

As used herein, "non-covalently couple" means that the first and second functional groups interact with one another via weak non-covalent forces, such as interactions or bonds, to link or otherwise couple strands of the thermoplastic polymer. As used herein, the phrase "weak non-covalent forces" is intended to denote hydrogen bonding, ionic bonding, Van der Waals forces, and the like.

As used herein, the phrases "green body metal part" and "green body part" denote a part that has not undergone heat treatment to remove the chemical binder. As used herein, the phrases "brown body metal part" and "brown body part" denote a part that has undergone heat treatment to remove the chemical binder. As used herein, a "metal part" means a part having metallic materials. While various aspects are described in the context of metal parts, the binder solutions described herein are applicable to a wide variety of parts, including but not limited to, polymer and ceramic parts.

As used herein, the phrase "water-based" includes mixtures, solutions, suspensions, dispersions and the like that include water as a primary liquid by volume, but may include one or more other liquids. Accordingly, the solvent used for various binder solutions is mostly water. In some aspects, the water is present at a concentration of at least about 50% of the binder solution by volume and in particular aspects, the water is present at a concentration of at least about 75% by volume. As used herein, the term "water" includes deionized water, distilled water, and tap water, unless otherwise specified. In aspects, water is ASTM D1193 type IV water or better.

In many binder jetting additive manufacturing processes, a chemical binder (e.g., a polymeric adhesive) is used to bond layers of powder to one another to form a three-dimensional object. The chemical binder may be, for example, a polymeric adhesive that is selectively deposited onto a powder bed in a pattern representative of a layer of the part being manufactured.

Conventional binder solutions including a relatively large amount (e.g., greater than 20 wt %) of non-aqueous solvent may require a relatively long time to wick into the layer of powder, which may increase the amount of time required before a subsequent layer of powder can be deposited within the build volume. A longer wick time decreases the throughput, and therefore the productivity, of the additive manufacturing apparatus.

To decrease wick time, a portion of the non-aqueous solvent may be replaced with water. However, decreasing the amount of non-aqueous solvent to a relatively small amount (e.g., less than 4 wt %) may result in a solution that does not produce a pattern on thermal paper.

As set forth above, the water-based binder solutions described herein comprise a thermoplastic binder, greater than or equal to 4 wt % to less than or equal to 20 wt % of a non-aqueous solvent having a boiling point greater than or equal to 100° C. and less than or equal to 175° C., and water. Less than or equal to 20 wt % of a non-aqueous solvent ensures that the water-based binder solution has a relatively decreased wicking time as compared to a conventional binder solution. Greater than or equal to 4 wt % of a non-aqueous solvent ensures that the water-based binder solution produces a pattern on thermal paper, which is important for monitoring the print head health, as sporadic jetting may lead to poor part quality. These and additional advantages will be described in greater detail below.

In various aspects, the thermoplastic binder may comprise a first polymer strand and at least one of a second polymer strand and a third polymer strand. As used herein, the term "polymer strand" includes a polymer backbone and a functional group grafted thereon. In aspects, the thermoplastic binder is a thermoplastic binder that generally decomposes with very low char yields without requiring the presence of oxygen ($O_2$) (e.g., in vacuum, inert, or reducing atmospheres). Accordingly, in aspects, the thermoplastic binder may be cleanly and readily removed from the part during sintering, generating a consolidated part that is substantially free of the thermoplastic binder and decomposition products that may be generated during heat treatment of a printed metal part, including, but not limited to, metal oxides and char.

The first polymer strand may include at least a first functional group. Functional groups of the first thermoplastic polymer strand may include, by way of example and not limitation, at least one of hydrogen bond donors, hydrogen bond acceptors, negatively charged groups, and positively charged groups. For example, in various aspects, the first functional group may be incorporated into or grafted onto the backbone of the polymer strand (e.g., a vinyl backbone, amide backbone, acryl backbone, or the like) and may be selected from hydroxyl groups, carboxylate groups, amine, thiol, amide, or other suitable functional groups that enable weak, non-covalent coupling (e.g., hydrogen bonding) of the first polymer strand and the second or third polymer strands.

In various aspects, the first polymer strand may include polymers such as, but not limited to, at least one of polyvinylpyrrolidone (PVP), polyvinyl alcohol (PVA), and derivatives thereof. In aspects, the first polymer strand may have a weight average molecular weight (Mw or weight average) greater than or equal to 5,000 g/mol and less than or equal to 15,000 g/mol. For example, the first polymer strand may have a weight average molecular weight (Mw) greater than or equal to 5,000 g/mol and less than or equal to 15,000 g/mol, greater than or equal to 5,000 g/mol and less than or equal to 12,500 g/mol, greater than or equal to 7,000 g/mol and less than or equal to 15,000 g/mol, greater than or equal to 7,000 g/mol and less than or equal to 12,500 g/mol, greater than or equal to 9,000 g/mol and less than or equal to 15,000 g/mol, or greater than or equal to 9,000 g/mol and less than or equal to 12,500 g/mol, including any and all ranges and subranges in between.

The first polymer strand may be included in the binder solution in an amount greater than or equal to 5 wt % and less than or equal to 20 wt %, greater than or equal to 5 wt % and less than or equal to 18 wt %, greater than or equal to 5 wt % and less than or equal to 16 wt %, greater than or equal to 5 wt % and less than or equal to 14 wt %, greater than or equal to 5 wt % and less than or equal to 12 wt %, greater than or equal to 7 wt % and less than or equal to 20 wt %, greater than or equal to 7 wt % and less than or equal to 18 wt %, greater than or equal to 7 wt % and less than or equal to 16 wt %, greater than or equal to 7 wt % and less than or equal to 14 wt %, greater than or equal to 7 wt % and less than or equal to 12 wt %, greater than or equal to 9 wt % and less than or equal to 20 wt %, greater than or equal to 9 wt % and less than or equal to 18 wt %, greater than or equal to 9 wt % and less than or equal to 16 wt %, greater than or equal to 9 wt % and less than or equal to 14 wt %, or greater than or equal to 9 wt % and less than or equal to 12 wt %, based on a total weight of the water-based binder solution, including any and all ranges and subranges in between.

In addition to the first polymer strand, the thermoplastic binder may include a second polymer strand, a third polymer strand, or second and third polymer strands. The second polymer strand may include at least a second functional group. Functional groups of the second thermoplastic polymer strand may include, by way of example and not limitation, at least one of hydrogen bond donors, hydrogen bond acceptors, negatively charged groups, and positively charged groups. In aspects, the second functional group of the second polymer strand may compliment a functional group of the first polymer strand of the thermoplastic binder to facilitate non-covalent coupling of the first and second polymer strands. For example, in various aspects, the second functional group may be incorporated into or grafted onto the backbone of the polymer strand (e.g., a vinyl backbone, amide backbone, acryl backbone, or the like) and may be selected from hydroxyl groups, carboxylate groups, amine, thiol, amide, or other suitable functional groups that enable weak, non-covalent coupling (e.g., hydrogen bonding) of the first and second polymer strands.

In various aspects, the second polymer strand may include polymers such as, but not limited to, at least one of polyvinyl alcohol (PVA), polyamides, polyacryl amide (PAAm), polyvinyl methyl ether maleic anhydride (PVME-MA), and derivatives thereof. In aspects, the second polymer strand may have a weight average molecular weight (Mw or weight average) greater than or equal to 10,000 g/mol and less than or equal to 50,000 g/mol. For example, the second polymer strand may have a weight average molecular weight (Mw) greater than or equal to 10,000 g/mol and less than or equal to 50,000 g/mol, greater than or equal to 10,000 g/mol and less than or equal to 30,000 g/mol, greater than or equal to 10,000 g/mol and less than or equal to 25,000 g/mol, greater than or equal to 10,000 g/mol and less than or equal to 23,000 g/mol, greater than or equal to 13,000 g/mol and less than or equal to 50,000 g/mol, greater than or equal to 13,000 g/mol and less than or equal to 30,000 g/mol, greater than or equal to 13,000 g/mol and less than or equal to 25,000 g/mol, greater than or equal to 13,000 g/mol and less than or equal to 23,000 g/mol, greater than or equal to 23,000 and less than or equal to 50,000 g/mol, greater than or equal to 23,000 g/mol and less than or equal to 30,000 g/mol, or greater than or equal to 23,000 g/mol and less than or equal to 25,000 g/mol, including any and all ranges and subranges in between.

When present, the second polymer strand may be included in the binder solution in an amount greater than or equal to 0.5 wt % and less than or equal to 7 wt %, greater than or equal to 0.5 wt % and less than or equal to 6 wt %, greater than or equal to 0.5 wt % and less than or equal to 5 wt %, greater than or equal to 1 wt % and less than or equal to 7 wt %, greater than or equal to 1 wt % and less than or equal to 6 wt %, greater than or equal to 1 wt % and less than or equal to 5 wt %, greater than or equal to 2 wt % and less than or equal to 7 wt %, greater than or equal to 2 wt % and less than or equal to 6 wt %, greater than or equal to 2 wt % and less than or equal to 5 wt %, greater than or equal to 3 wt % and less than or equal to 7 wt %, greater than or equal to 3 wt % and less than or equal to 6 wt %, or greater than or equal to 3 wt % and less than or equal to 5 wt %, based on a total weight of the water-based binder solution, including any and all ranges and subranges in between.

The third polymer strand may include at least a third functional group different from the first functional group of the first polymer strand and from the second functional group of the second polymer strand. Functional groups of the third thermoplastic polymer strand may include, by way of example and not limitation, at least one of hydrogen bond donors, hydrogen bond acceptors, negatively charged groups, and positively charged groups. In aspects, the second and third functional groups of the second and third polymer strands, respectively, may compliment the first functional group of the first polymer strand of the thermoplastic binder to facilitate non-covalent coupling of the first, second and third polymer strands. For example, in various aspects, the third functional group may be selected from hydroxyl groups, carboxylate groups, amine, thiol, amide, or other suitable functional groups that enable weak, non-covalent coupling of the first and third polymer strands.

In various aspects, the third polymer strand may include polymers such as, but not limited to, at least one of polyacrylic acid (PAA), poly methacrylic acid (PMAA), polyacrylamide (PAAm), and derivatives thereof. In aspects, the third polymer strand may have a weight average molecular weight (Mw or weight average) greater than or equal to 1,000 g/mol and less than or equal to 5,000 g/mol. For example, the second polymer strand may have a weight average molecular weight (Mw) greater than or equal to 1,000 g/mol and less than or equal to 5,000 g/mol, greater than or equal to 1,500 g/mol and less than or equal to 3,000 g/mol, or greater than or equal to 1,500 g/mol and less than or equal to 2,000 g/mol, including any and all ranges and subranges in between.

In aspects, the particular polymer selected as the third polymer strand may vary depending on the particular polymer selected as the first polymer strand and, when present, the second polymer strand. For example, the first polymer strand may be PVP, the second polymer strand may be PVA and the third polymer strand may be PAA. Other polymer combinations may be used, provided their functional groups are able to form non-covalent bonds with one another. For example, in aspects, one of the functional groups is a hydrogen donor, while the other functional group is a hydrogen acceptor.

When present, the third polymer strand may be present in the binder solution in an amount greater than or equal to 0.1 wt % and less than or equal to 5 wt %, greater than or equal to 0.1 wt % and less than or equal to 3 wt %, greater than or equal to 0.1 wt % and less than or equal to 2 wt %, greater than or equal to 0.5 wt % and less than or equal to 5 wt %, greater than or equal to 0.5 wt % and less than or equal to 3 wt %, greater than or equal to 0.5 wt % and less than or equal to 2 wt %, greater than or equal to 1 wt % and less than or equal to 5 wt %, greater than or equal to 1 wt % and less than or equal to 3 wt %, or greater than or equal to 1 wt % and less than or equal to 2 wt %, based on a total weight of the water-based binder solution, including any and all ranges and subranges in between.

As set forth above, in aspects, one or both of the second and third polymer strands may be included in the binder solution. For example, the binder solution may include the first polymer strand and the second polymer strand, the first polymer strand and the third polymer strand, or the first polymer strand, the second polymer strand, and the third polymer strand. Additionally, it should be appreciated that in various aspects, the first polymer strand differs from each of the second polymer strand and the third polymer strand, and the second polymer strand differs from the third polymer strand. The particular polymers selected as each polymer strand may vary depending on the particular polymer(s) selected as the other polymer strand(s). In aspects, the binder solution may include PVP as the first polymer strand and PVA as the second polymer strand. In aspects, the binder solution may include PVP as the first polymer strand and PAA as the third polymer strand. In aspects, the binder solution may include PVP as the first polymer strand, PVA as the second polymer strand, and PAA as the third polymer strand. Other polymer strand combinations are possible and contemplated.

In aspects, the polymers of the thermoplastic binder (e.g., the first polymer strand, the second polymer strand, or the third polymer strand) may be included at a total weight greater than or equal to 5 wt % and less than or equal to 20 wt %, based on a total weight of the water-based binder solution. For example, a total weight of the polymers may be greater than or equal to 5 wt % and less than or equal to 20 wt %, greater than or equal to 5 wt % and less than or equal to 19 wt %, greater than or equal to 5 wt % and less than or equal to 18 wt %, greater than or equal to 10 wt % and less than or equal to 20 wt %, greater than or equal to 10 wt % and less than or equal to 19 wt %, greater than or equal to 10 wt % and less than or equal to 18 wt %, greater than or equal to 12 wt % and less than or equal to 20 wt %, greater than or equal to 12 wt % and less than or equal to 19 wt %, or greater than or equal to 12 wt % and less than or equal to 18 wt %, based on a total weight of the water-based binder solution, including any and all ranges and subranges included therein.

The first polymer strand and the second or third polymer strands may be included in the binder solution in amounts to enable a suitable degree of coupling between the first polymer strand and the second or third polymer strands to yield a green body part having a green body strength suitable for handling during post-printing processes. In addition, the polymer strands may be present in amounts such that the binder solution has a viscosity from about 1 centipoise (cP) to about 40 cP using a rheometer. In aspects, the binder solution may have a viscosity from 2 cP to 40 cP, from 2 cP to 35 cP, from 2 cP to 30 cP, from 2 cP to 25 cP, from 2 cP to 20 cP, from 2 cP to 15 cP, from 2 cP to 12 cP, from 4 cP to 40 cP, from 4 cP to 35 cP, from 4 cP to 30 cP, from 4 cP to 25 cP, from 4 cP to 20 cP, from 4 cP to 15 cP, from 4 cP to 12 cP, from 6 cP to 40 cP, from 6 cP to 35 cP, from 6 cP to 30 cP, from 6 cP to 25 cP, from 6 cP to 20 cP, from 6 cP to 15 cP, from 6 cP to 12 cP, from 8 cP to 40 cP, from 8 cP to 35 cP, from 8 cP to 30 cP, from 8 cP to 25 cP, from 8 cP to 20 cP, from 8 cP to 15 cP, from 8 cP to 12 cP, including any and all ranges and subranges in between.

In addition to the thermoplastic binder, the binder solution includes a binder medium. The binder medium may include, for example, at least one water and one or more non-aqueous solvents. In aspects, the water-based binder solution may include a non-aqueous solvent having a boiling point of greater than $100°$ C. and less than or equal to $175°$ C. at 1 atm. The non-aqueous solvent may be generally non-reactive (e.g., inert) such that it does not react with the powder material, the thermoplastic binder, or other additives that may be included in the water-based binder solution. In aspects, in addition to being a solvent for the polymer strands, the non-aqueous solvent may act as a humectant, slowing evaporation of the water in the binder medium, which may in turn maintain reliability of the deposition and reduce the risk of flash curing during printing. The non-aqueous solvent may be, by way of example and not limitation, at least one of 2-methoxy ethanol, butanol, 2-butanol, tert-butanol, 1-methoxy-2-propanol, 2-butoxy ethanol, isoamyl alcohol, isobutyl alcohol, 2-butoxyethanol, and di(propylene glycol)dimethyl ether. In various aspects, the non-aqueous solvent may be at least one of 2-butoxyethanol and di(propylene glycol) dimethyl ether. The particular non-aqueous solvent may be selected based at least in part on the polymer strands of the thermoplastic binder and any other additives that may be included in the water-based binder solution.

It is believed that limiting the use of non-aqueous solvents that have a boiling point of greater than $100°$ C. may increase the vapor pressure of the water-based binder solution and decrease the cure energy requirement while maintaining the viscosity and wicking properties of the water-based binder solution. However, solvents that have a boiling point of greater than $175°$ C. were found to generally increase post-curing time by up to 50%. Accordingly, in various aspects, the non-aqueous solvent may have a boiling point of greater than $100°$ C. and less than or equal to $175°$ C., greater than or equal to $125°$ C. and less than or equal to $175°$ C., greater than or equal to $150°$ C. and less than or equal to $175°$ C., or greater than or equal to $165°$ C. and less than or equal to $175°$ C., including any and all ranges and subranges in between. Moreover, in aspects, the water-based binder solution is free of solvents having a boiling point of greater than 200° C., greater than 195° C., greater than 190° C., greater than 185° C., greater than 180° C., or greater than 175° C. at 1 atm.

Limiting the amount of non-aqueous solvent (e.g., less than or equal to 20 wt %) ensures that the water-based binder solution has a relatively decreased wicking time as compared to a conventional binder solution. However, the non-aqueous solvent should be included in amounts to produce a pattern on thermal paper (e.g., greater than or equal to 4 wt %), allowing for monitoring of the print head health. Accordingly, in aspects, the non-aqueous solvent may be included in the water-based binder solution in an amount greater than or equal to 4 wt % and less than or equal to 20 wt %, based on a total weight of the water-based binder solution. For example, the non-aqueous solvent may be included in the water-based binder solution in an amount, greater than or equal to 4 wt % and less than or equal to 20 wt %, greater than or equal to 4 wt % and less than or equal to 18 wt %, greater than or equal to 4 wt % and less than or equal to 16 wt %, greater than or equal to 4 wt % and less than or equal to 14 wt %, greater than or equal to 4 wt % and less than or equal to 12 wt %, greater than or equal to 6 wt % and less than or equal to 20 wt %, greater than or equal to 6 wt % and less than or equal to 18 wt %, greater than or equal to 6 wt % and less than or equal to 16 wt %, greater than or equal to 6 wt % and less than or equal to 14 wt %, greater than or equal to 6 wt % and less than or equal to 12 wt %, greater than or equal to 8 wt % and less than or equal to 20 wt %, greater than or equal to 8 wt % and less than or equal to 18 wt %, greater than or equal to 8 wt % and less than or equal to 16 wt %, greater than or equal to 8 wt % and less than or equal to 14 wt %, greater than or equal to 8 wt % and less than or equal to 12 wt %, greater than or equal to 10 wt % and less than or equal to 20 wt %, greater than or equal to 10 wt % and less than or equal to 18 wt %, greater than or equal to 10 wt % and less than or equal to 16 wt %, greater than or equal to 10 wt % and less than or equal to 14 wt %, greater than or equal to 10 wt % and less than or equal to 12 wt %, based on a total weight of the water-based binder solution, including any and all ranges and subranges in between.

In aspects, the non-aqueous solvent may comprise at least one of 2-butoxyethanol and di(propylene glycol)dimethyl ether, and the non-aqueous solvent may be included in the water-based binder solution in an amount greater than or equal to 4 wt % and less than or equal to 20 wt %, greater than or equal to 4 wt % and less than or equal to 18 wt %, greater than or equal to 4 wt % and less than or equal to 16 wt %, greater than or equal to 4 wt % and less than or equal to 14 wt %, or greater than or equal to 4 wt % and less than or equal to 12 wt %, based on a total weight of the water-based binder solution.

In aspects, the non-aqueous solvent may comprise at least one of 2-methoxyethanol and 2-ethoxyethanol, and the non-aqueous solvent may be included in the water-based binder solution in an amount greater than or equal to 10 wt % and less than or equal to 20 wt %, greater than or equal to 10 wt % and less than or equal to 18 wt %, greater than or equal to 10 wt % and less than or equal to 16 wt %, greater than or equal to 10 wt % and less than or equal to 14 wt %, or greater than or equal to 10 wt % and less than or equal to 12 wt %, based on a total weight of the water-based binder solution.

In aspects, the water-based binder solution may optionally include one or more additives, such as additives that may facilitate deposition of the thermoplastic binder into the powder material, improve the wettability of the powder material, modify the surface tension of the water-based binder solution, or the like. Optional additives include surfactants, diluents, viscosity modifiers, dispersants, stabilizers, dyes or other colorants, or other additives known and used in the art. In some aspects, the water-based binder solution includes at least one surfactant.

In aspects, surfactants improve wetting speed and mediate interaction between the thermoplastic binder and the powder. Surfactants suitable for use in the water-based binder solution may include ionic (e.g., zwitterionic, cationic, or anionic) or non-ionic depending on the properties of the thermoplastic binder or powder material. In various aspects, the surfactant may be at least one of 2-[4-(2,4,4-trimethyl-pentan-2-yl)phenoxy]ethanol (e.g., TRITON™ X-100 available from The Dow Chemical Company), polyoxyethylene (80) sorbitan monooleate (e.g., TWEEN™ 80 available from Croda Americas, Inc.), polyoxyethylene-23-lauryl ether (e.g., BRIJ™ L23 available from Croda Americas, Inc.), alkylene oxide copolymer (e.g., HYPERMER™ KD2 available from Croda Advanced Materials), sodium dodecyl sulfate (SDS), hexadecyltrimethylammonium bromide (CTAB), and dodecyltrimethylammonium bromide (DTAB), polypropoxy quaternary ammonium chloride (e.g., VARIQUAT™ CC 42 NS available from Evonik Industries).

It is believed that the inclusion of surfactant in the binder solution may reduce surface tension of the binder solution, thereby improving wettability of the powder material by the binder solution. Accordingly, in aspects, surfactant may be included in the binder solution in an amount greater than or equal to 0.1 wt % and less than or equal to 2 wt %, greater than or equal to 0.1 wt % and less than or equal to 1 wt %, greater than or equal to 0.25 wt % and less than or equal to 2 wt %, or greater than or equal to 0.25 wt % and less than or equal to 1 wt %, based on a total weight of the binder solution, including any and all ranges and sub-ranges included therein.

In various aspects, the binder medium may include water, which, in various aspects, may comprise the balance of the solution. In various aspects, water may be present in an amount of greater than or equal to 70 wt %, greater than or equal to 75 wt %, greater than or equal to 80 wt %, or greater than or equal to 85 wt %, based on a total weight of the binder solution.

Figure 2:
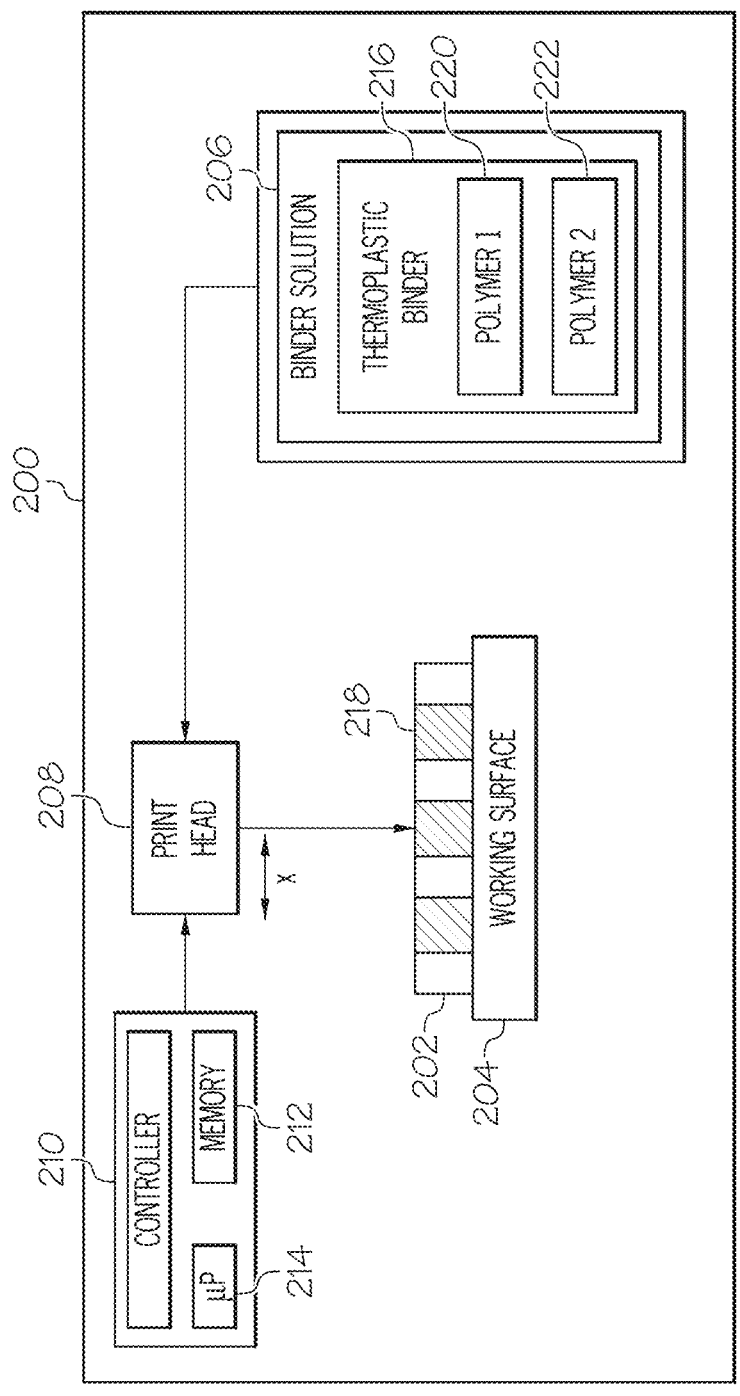
FIG. 2 is a block diagram of an aspect of an additive manufacturing apparatus used to manufacture the part in accordance with the method of FIG. 1.

Moreover, in various aspects, a green body part formed using the water-based binder solutions described herein may exhibit a green body strength of greater than or equal to 10 MPa on each of the x- and y-printed orientations. As used herein, the "x-orientation" refers to a part having a largest dimension (e.g., length) along the x-axis, and the "y-orientation" refers to a part having a largest dimension (e.g., length) along the y-axis. As used herein, unless otherwise specified, the "x-axis" is the direction in which the print head moves with respect to the build plate on which the green body part is manufactured, as shown in FIG. 2. As used herein, the "y-axis" is a direction perpendicular to the x-axis (shown in FIG. 2), such that each layer of the green body part lies within an x-y plane. The "z-axis" is an axis normal to the x-y plane, where layers are stacked on one another along the z-axis, as shown in FIG. 2. For example, the green body part may exhibit a green body strength greater than or equal to 10 MPa and less than or equal to 25 MPa, greater than or equal to 10 MPa and less than or equal to 20 MPa, greater than or equal to 12 MPa and less than or equal to 25 MPa, or greater than or equal to 12 MPa and less than or equal to 20 MPa, as measured in accordance with a 3-point bend test.

FIG. 1 is a block diagram depicting an aspect of a method 100 for manufacturing an article via additive manufacturing using the water-based binder solutions described herein. To facilitate discussion of aspects of the method 100, reference is made to FIG. 2, which is a block diagram depicting an aspect of an additive manufacturing apparatus 200 that may be used to perform method 100.

As depicted in FIG. 1, the method 100 begins with depositing a layer of a powder material 202 that is used to manufacture a part (block 102). In various aspects, the layer of the powder material 202 is deposited on a working surface 204 of the additive manufacturing apparatus. The powder material may be a metal powder, such as a nickel alloy, cobalt alloy, cobalt-chromium alloy, cast alloy, titanium alloy, aluminum-based materials, tungsten, stainless steel, or the like. Other powder materials may be used depending on the particular aspect.

Next, the method 100 continues with selectively depositing a water-based binder solution 206 into the layer of powder material 202 in a pattern representative of a structure of the part (block 104). The binder solution 206 may be, for example, any one of various aspects of the binder solution described herein. In various aspects, the binder solution 206 may be selectively printed using a print head 208 that is operated by a controller 210 based on a CAD design that includes a representation of the layer of the part being printed.

In various aspects, the controller 210 for controlling the print head 208 may include a distributed control system or any suitable device employing a general purpose computer or application-specific device. The controller 210 generally may include memory 212 storing one or more instructions for controlling operation of the print head 208. In aspects, the memory 212 may store CAD designs representative of a structure of the part being manufactured. In aspects, the CAD designs may include distortion compensation and, as such, the CAD design may not exactly match the geometry of the final desired part. Additionally, the controller 210 may include at least one processor 214 (e.g., microprocessor), and the memory 212 may include one or more tangible, non-transitory, machine-readable media collectively storing instructions executable by the processor 214 to control actions described herein.

After the binder solution 206 is selectively deposited into the layer of powder material 202, the thermoplastic binder 216 in the binder solution 206 at least partially coats an outer surface of powder particles, thereby generating binder-coated particles 218. As will be described, the thermoplastic binder 216 bonds the binder-coated particles 218 according to the pattern of the binder solution 206 printed into the layer of powder material 202 to form a layer of the green body part.

The method 100 may repeat the steps of depositing a layer of powder material (block 102) and selectively depositing the binder solution 206 into the layer of powder material (block 104) to continue building up the part in a layer-by-layer manner until a desired number of layers have been printed. The thermoplastic binder 216 of the binder solution 206 bonds each successive layer and provides a certain degree of strength (e.g., green body strength) to the green body part such that the integrity of the structure of the green body part is maintained during post-printing processes (e.g., transferring, inspecting, or depowdering). That is, the green body strength provided by the thermoplastic binder 216 of the binder solution 206 maintains bonding between the particles of the powder material 202 within the layers and blocks (e.g., resists or prevents) delamination of the layers during handling and post-printing processing of the green body part.

In various aspects, the method 100 continues with curing of the thermoplastic binder (block 106). For example, as discussed hereinabove, the binder solution 206 may be a mixture of a thermoplastic binder 216 and at least one solvent. In various aspects, the first and second polymer strands 220, 222 of the thermoplastic binder 216 may be coupled together via interaction between the first and second functional groups of the first and second polymer strands, respectively. Although the aspect depicted in FIG. 1 references the first and second polymer strands 220 and 222, other polymer strands (e.g., third polymer strands) may also interact with the other polymer strands in the thermoplastic binder 216 when present.

While a portion of the solvent in the binder solution 206 may be evaporated during deposition (e.g., printing) of the binder solution 206, a certain amount of the solvent may remain within the layer of the powder material 202. Therefore, in aspects, the binder solution 206 may be thermally cured at a temperature that is suitable for evaporating the solvent and allowing efficient bonding of the printed layers, thereby forming the green body part. Heat may be applied to the green body part using an IR lamp or heated plate, or may be carried out by placing the green body part in an oven.

Unbound particles from the powder layer (e.g., the powder material that is not bonded by the binder solution 206) may be removed before or after the curing step of block 106 to prepare the green body part for post-processing steps such as debinding and sintering.

In the aspect depicted in FIG. 1, the method 100 includes removing (e.g., debinding) a portion of the thermoplastic binder from the green body part to generate a brown body part (block 108). In various aspects, the binders provide strength (e.g., green body strength) to the green body part and, as such, only a portion (i.e., less than all) of the thermoplastic binder is removed during debinding of the green body part to improve the handling strength of the resulting brown body part before sintering.

During the debinding at block 108, the green body part is heated to break down a portion of the polymer strands of the thermoplastic binder 216. For example, the green body part may be heated to a temperature that is about 600° C. or less, or about 450° C. or less. In aspects, the green body part is heated to a temperature of from 250° C. to 450° C. The heating may be performed, for example, in an oxygen-free environment (e.g., in a vacuum, an inert atmosphere, or a combination of both), or in air for ceramic part sintering. In aspects in which the debinding is performed in an inert atmosphere, argon, nitrogen, or another substantially inert gas may be used. In some aspects, the debinding step may be combined with the sintering step to in order to make the final consolidated part.

According to various aspects, the debinding step of block 108 may be effective to remove greater than about 95% of the thermoplastic binder 216. For example, greater than or equal to 95%, greater than or equal to 96%, greater than or equal to 97%, greater than or equal to 98%, or greater than or equal to 99% of the total amount of thermoplastic binder is removed during debinding. In some aspects, the portion of the thermoplastic binder 216 that remains in the brown body part m less than or equal to 5%, less than or equal to 4%, less than or equal to 3%, less than or equal to 2%, or less than or equal to 1% of the amount of thermoplastic binder that was present prior to the debinding step. In aspects, the portion of the thermoplastic binder 216 that remains in the brown body part is from 0.05% to 2% or from 0.1% to 1% of the amount of thermoplastic binder that was present prior to the debinding step and is removed in the later stage of sintering process (e.g., beyond 600° C. and into the higher sintering temperatures as described in accordance with block 110 for stainless steel, nickel alloys, and the like).

Following debinding at block 108, the method 100 continues with sintering the brown body part to form the consolidated part (block 110). During sintering, the remaining portion of the thermoplastic binder (e.g., oligomers formed during debinding) may be removed from the brown body part and the particles of metal powder may be consolidated to form the consolidated part. Sintering imparts strength and integrity to the brown body part such that, after cooling, the consolidated part may be suitable for use in machinery, for example.

In some aspects, sintering may be performed according to a two-step process including a pre-sintering step in which the remaining portion of the thermoplastic binder is removed and a sintering step in which the metal powder particles are consolidated. In some aspects, sintering may be performed as a single step. During sintering, the brown body part may be heated to temperatures of greater than 500° C., greater than 800° C., or greater than 1000° C. In aspects, heat may applied by placing the brown body part in a furnace, or by exposing the brown body part to a concentrated source of energy, such as a laser beam, an electron beam, or another suitable energy source, depending on the particular aspect.

Figure 3:
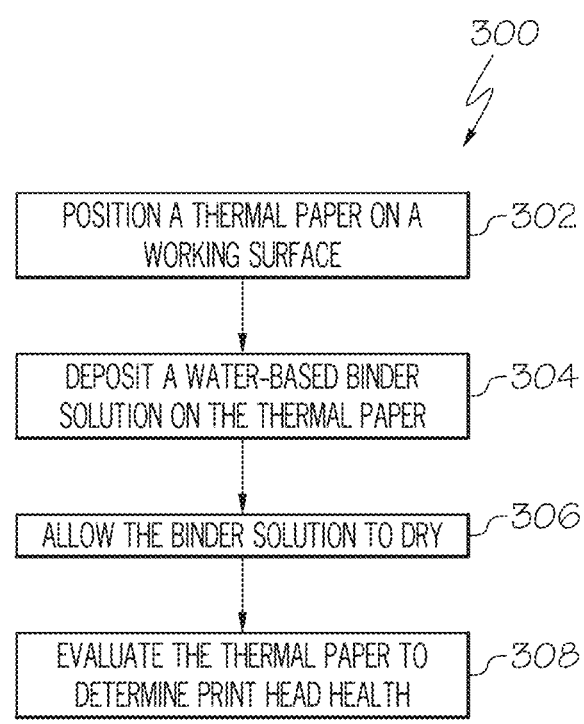
FIG. 3 is a flow diagram of an example method of monitoring a print head of an additive manufacturing process using a water-based binder solution according to one or more aspects shown and described herein.
Figure 4:
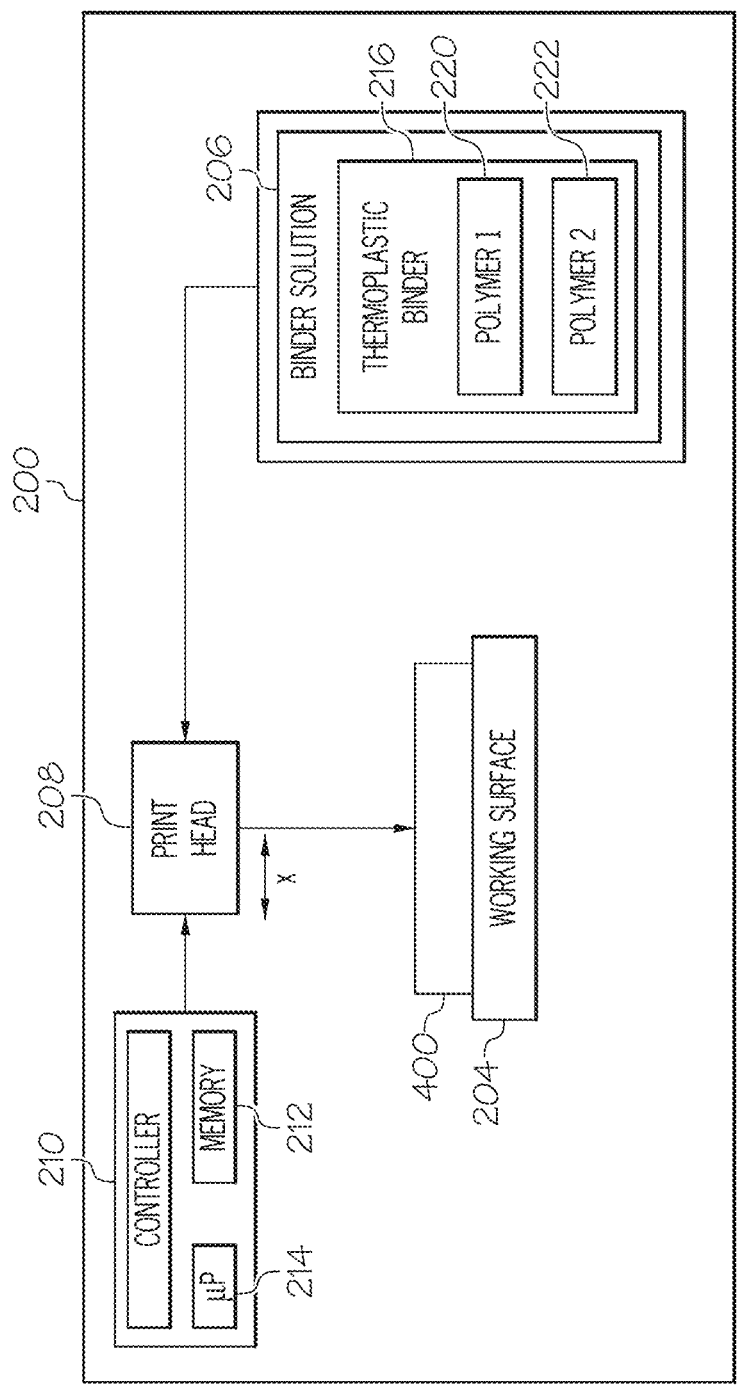
FIG. 4 is a block diagram of the additive manufacturing apparatus shown in FIG. 2 used to monitor a print head in accordance with the method of FIG. 3.
Figure 5:
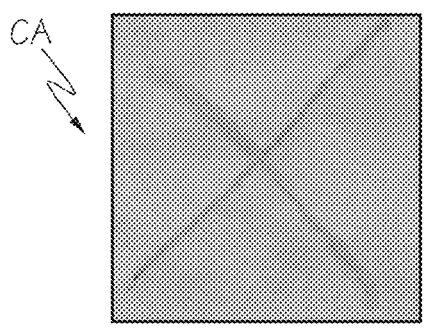
FIG. 5 is a photograph of a comparative water-based binder solution deposited on thermal paper according to one or more aspects of the disclosure shown and described herein.
Figure 9:
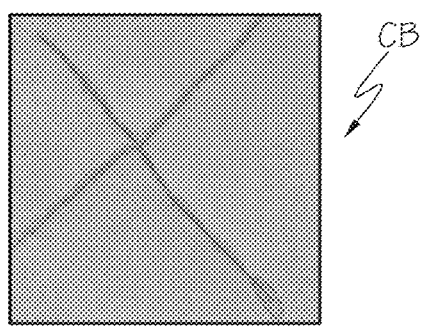
FIG. 9 is a photograph of a comparative water-based binder solution deposited on thermal paper.
Figure 6:
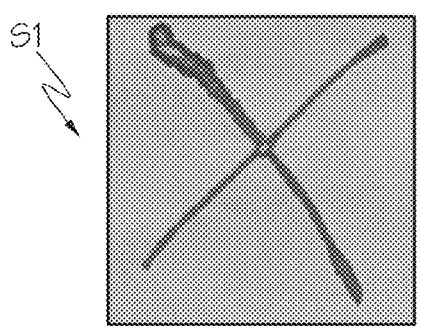
FIG. 6 is a photograph of an example water-based binder solution deposited on thermal paper, according to one or more aspects shown and described herein.
Figure 10:
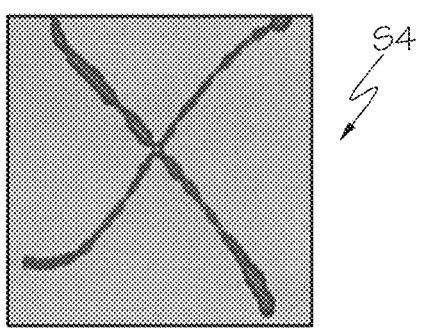
FIG. 10 is a photograph of an example water-based binder solution deposited on thermal paper, according to one or more aspects shown and described herein.
Figure 7:
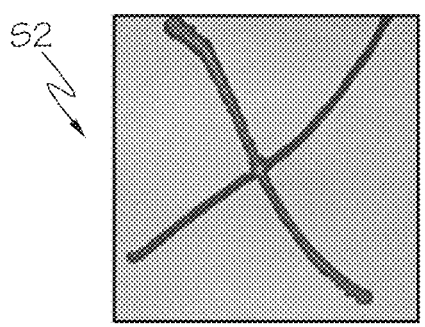
FIG. 7 is a photograph of an example water-based binder solution deposited on thermal paper, according to one or more aspects shown and described herein.
Figure 11:
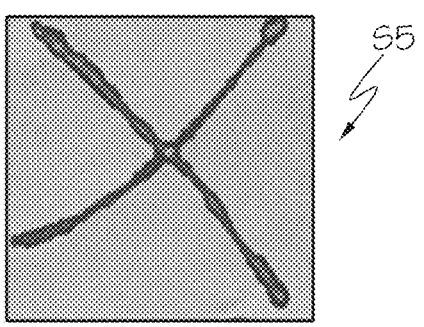
FIG. 11 is a photograph of an example water-based binder solution deposited on thermal paper, according to one or more aspects shown and described herein.
Figure 8:
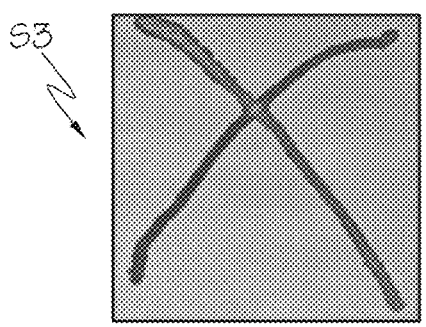
FIG. 8 is a photograph of an example water-based binder solution deposited on thermal paper, according to one or more aspects shown and described herein.
Figure 12:
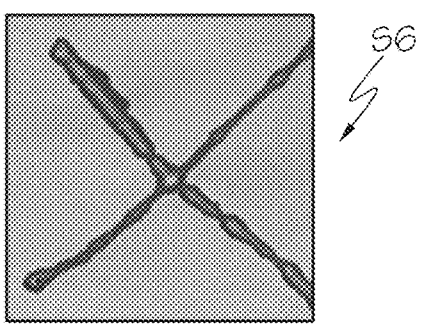
FIG. 12 is a photograph of an example water-based binder solution deposited on thermal paper, according to one or more aspects shown and described herein.

As described herein, monitoring print head health is important, as sporadic jetting may lead to poor part quality. FIG. 3 is a block diagram depicting an aspect of a method 300 for monitoring a print head of an additive manufacturing process using the water-based binder solutions described herein. To facilitate discussion of aspects of the method 300, reference is made to FIG. 4, which is a block diagram depicting the additive manufacturing apparatus 200 shown in FIG. 1 that may be used to perform method 300.

As depicted in FIG. 3, the method 300 begins with positioning a thermal paper 400 on a working surface 204 of the additive manufacturing apparatus 200 (block 302). The thermal paper 400 is coated with a material containing a color developer compound that changes color when contacted with certain solutions. Commercial examples of suitable thermal paper that may be used in the method 300 include Gorilla Supply® thermal paper, point-of-sale thermal paper, Methdic thermal paper, Alliance Supply thermal paper.

Next, the method 300 continues at block 304 with depositing a water-based binder solution 206 on the thermal paper 400. The binder solution 206 may be, for example, any one of various aspects of the binder solution described herein. In aspects, the binder solution 206 may be selectively printed using a print head 208 that is operated by a controller 410 based on a design that allows for evaluation of print head health (e.g., nozzle cleanliness).

The method 300 continues at block 306 with allowing the binder solution 206 to dry on the thermal paper 400 at room temperature for a period of time (e.g., 10 minutes).

The method 300 continues at block 308 with evaluating the thermal paper to determine the print head 208 health. For example, a sporadic pattern or a pattern that does not align with the intended design may be indicative of a print head issue (e.g., nozzle clogging) that may be need to be assessed further. In general, several cleaning cycles are given to print heads to allow robust jetting and pristine pattern formation.

Although various aspects described herein are described with reference to methods 100 and 300, it should be understood that aspects of the water-based binder solution described herein may be used with a variety of methods that are known and used by those skilled in the art. In particular, curing and sintering may be accomplished in a number of different ways, in a number of different steps, and in a number of different locations.

EXAMPLES

The following examples are provided to illustrate various aspects, but are not intended to limit the scope of the claims. All parts and percentages are by weight unless otherwise indicated. Approximate properties, characters, parameters, etc., are provided below with respect to various working examples, comparative examples, and the materials used in the working and comparative examples.

Six example water-based binder solutions (Samples 1-6) and two comparative water-based binder solutions (Comparative Samples A and B) were prepared by mixing thermoplastic binder in the form of one or more polymer strands in water and at least one additional co-solvent. All of the formulations (Comparative Samples A and B and Samples 1-6) included water as the primary solvent. Comparative Sample A and Samples 1-3 included a non-aqueous solvent, 2-butoxyethanol, having a boiling point of 171° C. at 1 atm and a vapor pressure of 0.8 mmHg. Comparative Sample B and Samples 4-6 included a non-aqueous solvent, di(propylene glycol) dimethyl ether (DPGDME), having a boiling point of 175° C. at 1 atm and a vapor pressure of 0.6 mmHg. All of the formulations (Comparative Samples A and B and Samples 1-6) included polyvinyl pyrrolidone (PVP) as the first polymer strand, poly(vinyl alcohol) (PVA) as the second polymer strand, and poly(acrylic acid) (PAA) as the third polymer strand. All of the formulations (Comparative Samples A and B and Samples 1-6) also included a surfactant, Triton-X or KD-2. The formulations for each of Comparative Samples A and B and Samples 1-6 are provided in Table 1 below.

TABLE 1

|  | Comp. Sample A | Comp. Sample B | Sample 1 | Sample 2 | Sample 3 | Sample 4 | Sample 5 | Sample 6 |
| --- | --- | --- | --- | --- | --- | --- | --- | --- |
| PVP | 10.0 | 10.0 | 10.0 | 10.0 | 10.0 | 10.0 | 10.0 | 10.0 |
| PVA | 4.0 | 4.0 | 4.0 | 4.0 | 4.0 | 4.0 | 4.0 | 4.0 |
| PAA | 1.0 | 1.0 | 1.0 | 1.0 | 1.0 | 1.0 | 1.0 | 1.0 |
| 2-butoxyethanol | 2.0 | — | 4.0 | 6.0 | 8.0 | — | — | — |
| DPGDME | — | 2.0 | — | — | — | 4.0 | 6.0 | 8.0 |
| Triton-X | 0.5 | 0.5 | 0.5 | 0.5 | 0.5 | 0.5 | 0.5 | 0.5 |
| Water | 82.5 | 82.5 | 80.5 | 78.5 | 76.5 | 80.5 | 78.5 | 76.5 |
| Wicking Time (sec) | 5.1 | 2.7 | 6.0 | 6.2 | 7.0 | 2.8 | 3.6 | 4.5 |

TABLE 1-continued

| | Comp. Sample A | Comp. Sample B | Sample 1 | Sample 2 | Sample 3 | Sample 4 | Sample 5 | Sample 6 |
|---|---|---|---|---|---|---|---|---|
| Green Strength (lbf) | 79.5 | — | — | — | — | 72.2 | — | — |

To evaluate the wicking rate, samples were prepared by depositing Praxair Truform 316-L00 powder into a petri dish and repeatedly tapping down the petri dish including the powder from about 0.5-1 inch from the surface 332 times using an AutoTap tap density analyzer instrument. For each sample, three 20 µL droplets of the binder solution were dispensed onto the powder bed and observed using video or timed using a stop watch. Wicking of the droplet was timed from the first contact of the binder solution until the sheen disappeared. The wicking time (in seconds) is reported in Table 1.

Green body samples were prepared by filling circular shaped silicone molds (4 cm×0.45 cm) with the metal powder and adding the binder to make a wet block. Samples were cured in a conventional oven at 200° C. or 170° C. for 1 hr. After cooling, the sample blocks were ejected out of the molds and used for further study. Green body strength was measured using a 3-point Instron tester. The green body strength is reported in Table 1.

As shown in Table 1, Samples 1-3, including 4 wt %, 6 wt %, and 8 wt % 2-butoxyethanol, respectively, had a comparable wicking time as compared to Comparative Sample A, including 2 wt % 2-butoxyethanol. Samples 4-6, including 4 wt %, 6 w %, and 8 wt % DPGDME, respectively, had a comparable wicking time as compared to Comparative Sample B, including 2 wt % DPGDME.

Referring now to FIGS. 5-12, 40 µL of Comparative Samples A and B (shown as CA and CB) and Samples 1-6 (shown as S1-S6) were drawn into a capillary tube, deposited in an "X" pattern on thermal paper, and allowed to dry for 10 minutes. As shown, Samples 1-6, formulations having 4 wt %, 6 wt %, or 8 wt % of a non-aqueous solvent, respectively, produced a pattern on the thermal pattern. Comparative Samples A and B only wetted the paper and did not produce a pattern on the thermal paper.

As exemplified by Table 1 and FIGS. 5-12, water-based binder solutions including 4 wt % to 20 wt % of a non-aqueous solvent have a comparable wicking time as compared to water-based binder solutions with less than 4 wt % non-aqueous solvent and result in patterns on thermal paper.

Further aspects of the aspects of the disclosure are provided by the subject matter of the following clauses:

1. A water-based binder solution for use in additive manufacturing comprising: a first polymer strand having a weight average molecular weight (Mw) greater than or equal to 5,000 g/mol and less than or equal to 15,000 g/mol; and at least one of a second polymer strand having a weight average molecular weight (Mw) greater than or equal to 10,000 g/mol and less than or equal to 50,000 g/mol and a third polymer strand having a weight average molecular weight (Mw) greater than or equal to 1,000 g/mol and less than or equal to 5,000 g/mol; wherein the first polymer strand differs from each of the second polymer strand and the third polymer strand and the second polymer strand differs from the third polymer strand; greater than or equal to 4 wt % to less than or equal to 20 wt % of a non-aqueous solvent, based on a total weight of the water-based binder solution, the non-aqueous solvent having a boiling point greater than or equal to 100° C. and less than or equal to 175° C.; and water.

2. The water-based binder solution of any preceding clause, wherein the non-aqueous solvent is present in the water-based binder solution in an amount greater than or equal to 6 wt % and less than 18 wt %, based on the total weight of the water-based binder solution.

3. The water-based binder solution of any preceding clause, wherein the non-aqueous solvent comprises at least one of 2-methoxy ethanol, butanol, 2-butanol, tert-butanol, 1-methoxy-2-propanol, 2-butoxy ethanol, isoamyl alcohol, isobutyl alcohol, 2-butoxyethanol, and di(propylene glycol) dimethyl ether.

4. The water-based binder solution of any preceding clause, wherein the first polymer strand comprises at least one of polyvinyl pyrrolidone (PVP) and polyvinyl alcohol (PVA).

5. The water-based binder solution of any preceding clause, wherein the first polymer strand is present in an amount greater than or equal to 5 wt % and less than or equal to 20 wt %, based on the total weight of the water-based binder solution.

6. The water-based binder solution of any preceding clause, wherein the thermoplastic binder comprises the second polymer strand in an amount greater than or equal to 0.5 wt % and less than or equal to 7 wt %, based on the total weight of the water-based binder solution.

7. The water-based binder solution of any preceding clause, wherein the thermoplastic binder comprises the third polymer strand in an amount greater than or equal to 0.1 wt % and less than or equal to 5 wt %, based on the total weight of the water-based binder solution.

8. The water-based binder solution of any preceding clause, wherein the second polymer strand comprises at least one of polyvinyl alcohol (PVA), polyacryl amide (PAAm), polyvinyl methyl ether maleic anhydride (PVME-MA), and derivatives thereof.

9. The water-based binder solution of any preceding clause, wherein the third polymer strand comprises polyacrylic acid (PAA), polymethyl methacrylate (PMMA), polyacrylamide (PAAm), and derivatives thereof.

10. The water-based binder solution of any preceding clause, wherein the water-based binder solution further comprises greater than or equal to 0.1 wt % and less than or equal to 2 wt % of a surfactant, based on a total weight of the water-based binder solution.

11. The water-based binder solution of any preceding clause, wherein a total weight of polymers present in the water-based binder solution is greater than or equal to 5 wt % and less than or equal to 20 wt %, based on a total weight of the water-based binder solution.

12. A method of monitoring a print head of an additive manufacturing process comprises: positioning a thermal paper on a working surface; and depositing a water-based binder solution on the thermal paper, the water-based binder solution comprising: greater than or equal to 4 wt % to less than or equal to 20 wt % of a non-aqueous solvent, based on a total weight of the water-based binder solution, the non-aqueous solvent having a boiling point greater than or equal to 100° C. and less than or equal to 175° C.; and a thermoplastic binder, the thermoplastic binder comprising: a first polymer strand having a weight average molecular weight (Mw) greater than or equal to 5,000 g/mol and less than or equal to 15,000 g/mol; and at least one of a second polymer strand having a weight average molecular weight (Mw) greater than or equal to 10,000 g/mol and less than or equal to 50,000 g/mol and a third polymer strand having a weight average molecular weight (Mw) greater than or equal to 1,000 g/mol and less than or equal to 5,000 g/mol, wherein the first polymer strand differs from each of the second polymer strand and the third polymer strand; and wherein the second polymer strand differs from the third polymer strand.

13. The method of any preceding clause, wherein the non-aqueous solvent is present in the water-based binder solution in an amount greater than or equal to 6 wt % and less than 18 wt %, based on the total weight of the water-based binder solution.

14. The method of any preceding clause, wherein the non-aqueous solvent comprises at least one of 2-methoxy ethanol, butanol, 2-butanol, tert-butanol, 1-methoxy-2-propanol, 2-butoxy ethanol, isoamyl alcohol, isobutyl alcohol, 2-butoxyethanol, and di(propylene glycol) dimethyl ether.

15. The method of any preceding clause, wherein the first polymer strand comprises at least one of polyvinyl pyrrolidone (PVP) and polyvinyl alcohol (PVA).

16. The method of any preceding clause, wherein the first polymer strand is present in an amount greater than or equal to 5 wt % and less than or equal to 20 wt %, based on the total weight of the water-based binder solution.

17. The method of any preceding clause, wherein the thermoplastic binder comprises the second polymer strand in an amount greater than or equal to 0.5 wt % and less than or equal to 7 wt %, based on the total weight of the water-based binder solution.

18. The method of any preceding clause, wherein the thermoplastic binder comprises the third polymer strand in an amount greater than or equal to 0.1 wt % and less than or equal to 5 wt %, based on the total weight of the water-based binder solution.

19. The method of any preceding clause, wherein a total weight of polymers present in the water-based binder solution is greater than or equal to 5 wt % and less than or equal to 20 wt %, based on the total weight of the water-based binder solution.

20. A method of additive manufacturing comprises: depositing a layer of a powder on a working surface; selectively depositing a water-based binder solution comprising a thermoplastic binder and greater than or equal to 4 wt % to less than or equal to 20 wt % of a non-aqueous solvent, based on a total weight of the water-based binder solution, having a boiling point greater than or equal to 100° C. and less than or equal to 175° C. into the layer of powder in a pattern representative of a structure of a part, wherein: the thermoplastic binder comprises: a first polymer strand having a weight average molecular weight (Mw) greater than or equal to 5,000 g/mol to less than or equal to 15,000 g/mol; and at least one of a second polymer strand having a weight average molecular weight (Mw) greater than or equal to 10,000 g/mol to less than or equal to 50,000 g/mol and a third polymer strand having a weight average molecular weight (Mw) greater than or equal to 1,000 g/mol to less than or equal to 5,000 g/mol; the first polymer strand differs from each of the second polymer strand and the third polymer strand; the second polymer strand differs from the third polymer strand; and coupling the first polymer strand with the at least one of the second polymer strand and the third polymer strand to form a green body part.

It will be apparent to those skilled in the art that various modifications and variations can be made to aspect of the present disclosure without departing from the spirit and scope of the disclosure. Thus, it is intended that the present disclosure cover such modifications and variations provided they come within the scope of the appended claims and their equivalents.

What is claimed is:

1. A water-based binder solution for use in additive manufacturing, comprising:
   a thermoplastic binder comprising:
      a first polymer strand having a weight average molecular weight (Mw) greater than or equal to 5,000 g/mol and less than or equal to 15,000 g/mol; and
      at least one of a second polymer strand having a weight average molecular weight (Mw) greater than or equal to 10,000 g/mol and less than or equal to 50,000 g/mol and a third polymer strand having a weight average molecular weight (Mw) greater than or equal to 1,000 g/mol and less than or equal to 5,000 g/mol;
   wherein the first polymer strand differs from each of the second polymer strand and the third polymer strand and the second polymer strand differs from the third polymer strand;
   greater than or equal to 4 wt % to less than or equal to 20 wt % of a non-aqueous solvent, based on a total weight of the water-based binder solution, the non-aqueous solvent having a boiling point greater than or equal to 100° C. and less than or equal to 175° C.; and
   water.

2. The water-based binder solution of claim 1, wherein the non-aqueous solvent is present in the water-based binder solution in an amount greater than or equal to 6 wt % and less than 18 wt %, based on the total weight of the water-based binder solution.

3. The water-based binder solution of claim 1, wherein the non-aqueous solvent comprises at least one of 2-methoxy ethanol, butanol, 2-butanol, tert-butanol, 1-methoxy-2-propanol, 2-butoxy ethanol, isoamyl alcohol, isobutyl alcohol, 2-butoxyethanol, and di(propylene glycol)dimethyl ether.

4. The water-based binder solution of claim 1, wherein the first polymer strand comprises at least one of polyvinyl pyrrolidone (PVP) and polyvinyl alcohol (PVA).

5. The water-based binder solution of claim 4, wherein the first polymer strand is present in an amount greater than or equal to 5 wt % and less than or equal to 20 wt %, based on the total weight of the water-based binder solution.

6. The water-based binder solution of claim 1, wherein the thermoplastic binder comprises the second polymer strand in an amount greater than or equal to 0.5 wt % and less than or equal to 7 wt %, based on the total weight of the water-based binder solution.

7. The water-based binder solution of claim 6, wherein the thermoplastic binder comprises the third polymer strand in an amount greater than or equal to 0.1 wt % and less than or equal to 5 wt %, based on the total weight of the water-based binder solution.

8. The water-based binder solution of claim 1, wherein the second polymer strand comprises at least one of polyvinyl alcohol (PVA), polyacryl amide (PAAm), polyvinyl methyl ether maleic anhydride (PVME-MA), and derivatives thereof.

9. The water-based binder solution of claim 1, wherein the third polymer strand comprises at least one of polyacrylic acid (PAA), polymethyl methacrylate (PMMA), polyacrylamide (PAAm), and derivatives thereof.

10. The water-based binder solution of claim 1, wherein the water-based binder solution further comprises greater than or equal to 0.1 wt % and less than or equal to 2 wt % of a surfactant, based on a total weight of the water-based binder solution.

11. The water-based binder solution of claim 1, wherein a total weight of polymers present in the water-based binder solution is greater than or equal to 5 wt % and less than or equal to 20 wt %, based on a total weight of the water-based binder solution.

12. A method of monitoring a print head of an additive manufacture process, the method comprising:
positioning a thermal paper on a working surface; and
depositing a water-based binder solution on the thermal paper, the water-based binder solution comprising:
greater than or equal to 4 wt % to less than or equal to 20 wt % of a non-aqueous solvent, based on a total weight of the water-based binder solution, the non-aqueous solvent having a boiling point greater than or equal to 100° C. and less than or equal to 175° C.; and
a thermoplastic binder, the thermoplastic binder comprising:
a first polymer strand having a weight average molecular weight (Mw) greater than or equal to 5,000 g/mol and less than or equal to 15,000 g/mol; and
at least one of a second polymer strand having a weight average molecular weight (Mw) greater than or equal to 10,000 g/mol and less than or equal to 50,000 g/mol and a third polymer strand having a weight average molecular weight (Mw) greater than or equal to 1,000 g/mol and less than or equal to 5,000 g/mol;
wherein the first polymer strand differs from each of the second polymer strand and the third polymer strand; and
wherein the second polymer strand differs from the third polymer strand.

13. The method of claim 12, wherein the non-aqueous solvent is present in the water-based binder solution in an amount greater than or equal to 6 wt % and less than 18 wt %, based on the total weight of the water-based binder solution.

14. The method of claim 12, wherein the non-aqueous solvent comprises at least one of 2-methoxy ethanol, butanol, 2-butanol, tert-butanol, 1-methoxy-2-propanol, 2-butoxy ethanol, isoamyl alcohol, isobutyl alcohol, 2-butoxyethanol, and di(propylene glycol)dimethyl ether.

15. The method of claim 12, wherein the first polymer strand comprises at least one of polyvinyl pyrrolidone (PVP) and polyvinyl alcohol (PVA).

16. The method of claim 15, wherein the first polymer strand is present in an amount greater than or equal to 5 wt % and less than or equal to 20 wt %, based on the total weight of the water-based binder solution.

17. The method of claim 12, wherein the thermoplastic binder comprises the second polymer strand in an amount greater than or equal to 0.5 wt % and less than or equal to 7 wt %, based on the total weight of the water-based binder solution.

18. The method of claim 17, wherein the thermoplastic binder comprises the third polymer strand in an amount greater than or equal to 0.1 wt % and less than or equal to 5 wt %, based on the total weight of the water-based binder solution.

19. The method of claim 12, wherein a total weight of polymers present in the water-based binder solution is greater than or equal to 5 wt % and less than or equal to 20 wt %, based on the total weight of the water-based binder solution.

20. A method of additive manufacturing comprising:
depositing a layer of a powder on a working surface;
selectively depositing a water-based binder solution comprising a thermoplastic binder and greater than or equal to 4 wt % to less than or equal to 20 wt % of a non-aqueous solvent, based on a total weight of the water-based binder solution, having a boiling point greater than or equal to 100° C. and less than or equal to 175° C. into the layer of powder in a pattern representative of a structure of a part, wherein:
the thermoplastic binder comprises:
a first polymer strand having a weight average molecular weight (Mw) greater than or equal to 5,000 g/mol to less than or equal to 15,000 g/mol; and
at least one of a second polymer strand having a weight average molecular weight (Mw) greater than or equal to 10,000 g/mol to less than or equal to 50,000 g/mol and a third polymer strand having a weight average molecular weight (Mw) greater than or equal to 1,000 g/mol to less than or equal to 5,000 g/mol;
wherein the first polymer strand differs from each of the second polymer strand and the third polymer strand; and
wherein the second polymer strand differs from the third polymer strand; and
coupling the first polymer strand with the at least one of the second polymer strand and the third polymer strand to form a green body part.

* * * * *